United States Patent [19]
Harrington

[11] Patent Number: 5,837,787
[45] Date of Patent: Nov. 17, 1998

[54] PROCESS FOR PRODUCING ELASTIC THERMOPLASTIC α-OLEFIN/CYCLIC OLEFIN COPOLYMERS

[75] Inventor: Bruce Allan Harrington, Houston, Tex.

[73] Assignee: Exxon Chemical Patents, Inc., Houston, Tex.

[21] Appl. No.: 5,676

[22] Filed: Jan. 19, 1993

[51] Int. Cl.$^6$ .......................... C08F 4/642; C08F 232/04
[52] U.S. Cl. .......................... 526/160; 526/126; 526/127; 526/133; 526/134; 526/151; 526/153; 526/170; 526/281; 526/308
[58] Field of Search ..................... 526/281, 160, 526/308, 126, 127, 132, 133, 134, 151, 153, 170

[56] References Cited

U.S. PATENT DOCUMENTS

| | | | |
|---|---|---|---|
| 2,934,527 | 4/1960 | McKay et al. | 526/281 |
| 3,313,786 | 4/1967 | Kahle et al. | 526/308 |
| 3,876,595 | 4/1975 | Ogura et al. . | |
| 4,614,778 | 9/1986 | Kajiura et al. | 526/281 |
| 4,990,559 | 2/1991 | Shiraki et al. . | |
| 5,008,356 | 4/1991 | Ishimaru et al. | 526/281 |
| 5,087,677 | 2/1992 | Brekner et al. . | |
| 5,629,398 | 5/1997 | Okamoto et al. | 526/281 |

FOREIGN PATENT DOCUMENTS

| | | |
|---|---|---|
| 203 799 | 12/1986 | European Pat. Off. . |
| 283 164 | 9/1988 | European Pat. Off. . |
| 395 075 | 10/1990 | European Pat. Off. . |
| 496 193 | 7/1992 | European Pat. Off. . |
| 501 370 | 9/1992 | European Pat. Off. . |
| 503 422 | 9/1992 | European Pat. Off. . |
| 504 418 | 9/1992 | European Pat. Off. . |
| 61-0221206 | 10/1986 | Japan ..................................... 526/160 |
| 62-215611 | 9/1987 | Japan . |
| 92/06123 | 4/1992 | WIPO . |

OTHER PUBLICATIONS

Seymour et al, Polymer Chemistry . . . (2nd ed.), Marcel Dekker, Inc., N.Y., N.Y., 447–8 (1988).
Hackh's Chemical Dictionary (4th ed.) J. Grant (ed.), McGraw–Hill Book Co., Inc., N.Y., 472 (1969).
Catalysts Consultants, Inc., Metcon, '93 May 26–28, 1993.
Plasics Industry News Nov. 1991 pp. 165–166.
Makrol Mol. Chem. 190, 515–526 (1989).
European Chemical News Apr. 4, 1994, p. 27.

*Primary Examiner*—Fred Teskin
*Attorney, Agent, or Firm*—William G. Muller; Douglas W. Miller; Catherine L. Bell

[57] ABSTRACT

Rubbery, amorphous cyclic olefin/α-olefin copolymers in a molar ratio from 5/95 to 30/70. The copolymers are rubbery and have the general properties of thermoplastic elastomers, e.g. good elastic recovery, toughness, and high elasticity, and have a relatively low glass transition temperature (Tg) to avoid brittleness and hardness under normal use temperature. The copolymers also have a high molecular weight, a narrow molecular weight distribution and a uniform, random comonomer distribution to impart a rubbery loss modulus plateau over the temperature range from Tg to above 100° C., and are optionally lightly crosslinked or plasticized to further extend their useful temperature range.

6 Claims, 7 Drawing Sheets

PROCESS FOR PRODUCING ELASTIC THERMOPLASTIC α-OLEFIN/CYCLIC OLEFIN COPOLYMERS

FIELD OF THE INVENTION

This invention relates to elastic copolymers of an α-olefin with a cyclic olefin comonomer, and particularly to such copolymers containing a comonomer content which can impart resiliency, tensile strength and snapback memory to the copolymers without the use of halogen-containing monomers and large amounts of plasticizer.

BACKGROUND OF THE INVENTION

Plasticized polyvinyl chloride (PVC) film is well recognized for its attributes including superior gloss and clarity, tensile strength and elastic recovery at small deformation. This is particularly desirable in the selection of overwrap materials for meat packaging because PVC has sufficient oxygen permeability to retain the red color in fresh meat, and the recovery properties needed to keep the packages taut after consumer handling. There has been, however, an increased concern over plasticizer migration from food and medical packaging, and the incineration byproducts from halogen-containing materials. Any replacement polymer, which has a reduced content or elimination of plasticizers, or which eliminates halogen incineration products, would have an advantage over PVC. Polyolefins can economically be made to have gloss, clarity and oxygen permeability comparable to PVC, but the films do not exhibit the necessary elastic recovery. There exists a need for an olefin-based polymer which has the tensile recovery properties of plasticized PVC, as well as the other necessary requirements, but which does not rely on plasticizers.

PVC is predominantly amorphous, but it can contain up to about 15 percent crystallinity. PVC crystals have a structure which more closely follows a fringed micelle model than the lamellar model which polyethylene closely follows. However, PVC exhibits a greater resistance to elongation than would be expected from its very low crystallinity. In order to improve processability, plasticizers are usually added to PVC to break up dipole-dipole interactions. Plasticization is generally believed in the art to be a dynamic process with plasticizer-PVC "bonds" being broken and reformed continually. After elongation, the plasticizer molecules can redissolve the PVC and interrupt dipole-dipole interactions which may have formed on stretching, facilitating at least partial recovery of the PVC.

Polyethylene, on the other hand, is a highly crystalline polymer whose crystallites are usually arranged in lamellae which can have quite large lateral dimensions. This crystallinity contributes greatly to the strength of polyethylene. When polyethylene is stretched, the amorphous regions elongate or give to a certain extent. However, when the yield stress of the weakest crystallite is reached, cold flow and permanent set occur. Elasticity of polyethylene can be improved by using a comonomer such as vinyl acetate or other α-olefins to reduce crystallinity, and concomitantly, the amount of permanent set measured after elongating the copolymers is reduced. However, the improvement in elasticity and memory, or snapback properties, is at the expense of reducing the strength of the copolymer to a level which is much lower than that of a more crystalline polyethylene. Thus, various efforts directed to blends of crystalline polyethylene with non-crystalline or lower-crystalline materials still obtain regions of well-formed, large crystallites which cold draw and suffer permanent set. For example, a low density polyethylene (LDPE) having a melt index of about 2.0 dg/min has a stress at 150% elongation of about 1300 psi, and a set (measured after 1 minute relaxation time) of about 80%, i.e. a recovery of only 20%. When vinyl acetate (VA) is added as a comonomer, the permanent set and stress both decline in a generally linear correlation with the increase of VA content. An ethylene-vinyl acetate copolymer EVA containing 28% vinyl acetate has a stress at 150% of 500 psi and a set of 30%; intermediate-VA-content EVA's have intermediate stress (strength) and set (100 minus the percent recovery): 9% VA EVA has a 150% stress of about 1025 psi and a set of 60%; 12% VA, 150% stress of about 910 psi, set of 55%, measured at the same conditions.

U.S. Pat. No. 5,087,677 to Brekner et al. discloses polymers of polycyclic olefins, optionally with α-olefin and/or monocyclic olefins, prepared with a stereorigid, chiral bridged bis(cyclopentadienyl) transition metal catalyst and alumoxane cocatalyst, reported to have a relatively high polydispersity value (MWD) between 2.9 and 6.0 and a glass transition temperature ($T_g$) above 100° C. Tables 3–6 therein report various copolymers of norbornene with ethylene or propylene.

European Patent Application 283,164 discloses copolymers of $C_3$ to $C_{20}$ α-olefin and cycloolefin prepared with an alkylene bis(indenyl) zirconium compound and an alumoxane. However, no ethylene or propylene copolymers having both a molecular weight above about 24,000 daltons and a molecular weight distribution below 2 were reported.

European Patent Application 501,370 discloses polycyclic olefin homopolymers and copolymers with monocycloolefins and/or acyclic α-olefins, prepared with a stereorigid, chiral bridged transition metal catalyst and alumoxane cocatalyst, reported to have a molecular weight distribution $M_w/M_n$ less than 2. However, none of the examples show a copolymer having both $M_w/M_n$ less than 2 and $M_w$ greater than 50,000.

European Patent Application 503,422 discloses the preparation of polycyclic olefin homopolymers and copolymers with monocycloolefins and/or acyclic α-olefins, with a stereorigid bridged bis(cyclohydrocarbyl) metallocene which has C1 symmetry or is in the meso form, and an alumoxane cocatalyst, reported to have more chemical homogeneity as reflected in a lesser dependence of $T_g$ of the ethylene copolymers on reaction parameters like the ethylene pressure.

Commonly assigned U.S. Ser. No. 07/133,480, filed Dec. 22, 1987, by Turner and Hlatky, now abandoned, discloses olefin polymerization with a bis(cyclopentadienyl) metal compound and a bulky, labile Lewis-acid anion activator such as tetra(perfluorophenyl) borate in liquid olefins which may act as monomers or comonomers including cyclopentene. EPA 277,004, published Mar. 8, 1988, corresponds thereto and is hereby incorporated herein by reference. Similarly, copending application U.S. Ser. No. 07/770,499, filed Oct. 3, 1991, by Canich et al., now abandoned; which is a continuation-in-part of U.S. Ser. No. 581,841, Sept. 13, 1990, now U.S. Pat. No. 5,096,867; which in turn is a continuation-in-part of U.S. Ser. No. 533,245, Jun. 4, 1990, now U.S. Pat. No. 5,055,438; which is in turn a continuation-in-part of U.S. Ser. No. 406,945, Sept. 13, 1989, now abandoned; discloses polymerizing ethylene in combination with other monomers such as norbornene using a monocyclopentadienyl metal compound and an alumoxane.

Kaminsky et al., Makromol. Chem., volume 190, pp. 515–526 (1989), discloses polymerization of cyclopentene, cycloheptene and cyclooctene with ethylene using the chiral catalyst ethylene(bisindenyl) zirconium dichloride/methylaluminoxane to form isotactic copolymers. The ethylene-cyclopentene copolymers are reported to have molecular weights below 24,000 and MWD between 3 and 4.5.

None of the above mentioned references disclose a rubbery, amorphous α-olefin/cyclic olefin copolymer having both tensile strength and elastic recovery.

SUMMARY OF THE INVENTION

In accordance with the present invention, α-olefin and cyclic olefin are copolymerized, for example, in the presence of a catalyst system comprising an activated cyclopentadienyl transition metal compound. Quite surprisingly, it has been found that when the cyclic olefin is incorporated in a relatively high molecular weight copolymer at certain molar proportions, the resulting copolymer unexpectedly behaves much like a thermoplastic elastomer, and can be tough, but soft and resilient, with good shape memory for recovery to a pretensioned condition, and also can have good optical properties and oxygen permeability. The copolymers of this invention can, as one exemplary embodiment, be used as a food packaging film in much the same manner as plasticized PVC or in medical applications such as tubing, blood bags and others.

The present invention resides, in part, in the discovery that cyclic olefin can be polymerized with α-olefin using a coordination catalyst to obtain a rubbery, amorphous copolymer. The copolymer can have, for example, a high molecular weight with 5 to 30 mole percent cyclic olefin comonomer incorporation, a narrow molecular weight distribution and a relatively random and uniform comonomer distribution. The present invention also resides, in part, in the discovery that articles made from certain of the copolymers have very surprising properties, such as, for example, high elasticity and strength, as well as an excellent elastic recovery.

The present invention provides an α-olefin/cyclic olefin copolymer which is substantially compositionally uniform and can include from 5 up to 30 mole percent of the cyclic olefin, preferably from 10 to 20 mole percent, and especially from 10 to 15 mole percent, incorporated substantially randomly into the polymer. The copolymer preferably has a weight average molecular weight from about 30,000 to about 1,000,000 daltons or more, more preferably from about 60,000 to about 300,000 daltons; and a molecular weight distribution substantially less than about 4, more preferably from 1.2 to 2.0. The copolymer is generally amorphous as reflected by the absence of a well-defined melting point by differential scanning calorimetry, and the substantial absence of crystalline phase transitions. The copolymer preferably has a glass transition temperature between −50° C. and 50° C. In addition, the copolymer preferably has a rubbery storage modulus from its glass transition temperature to above 100° C. The copolymer can optionally include plasticizer(s) and/or crosslinking to extend the use temperature to lower and higher limits, respectively.

The present invention also provides useful articles made from the foregoing copolymer, including fibers, films, sheets, coatings and molded articles. In particular, the invention provides articles made from the copolymers having elasticity, softness, toughness, and elastic recovery.

DETAILED DESCRIPTION OF THE INVENTION

Figure 1:
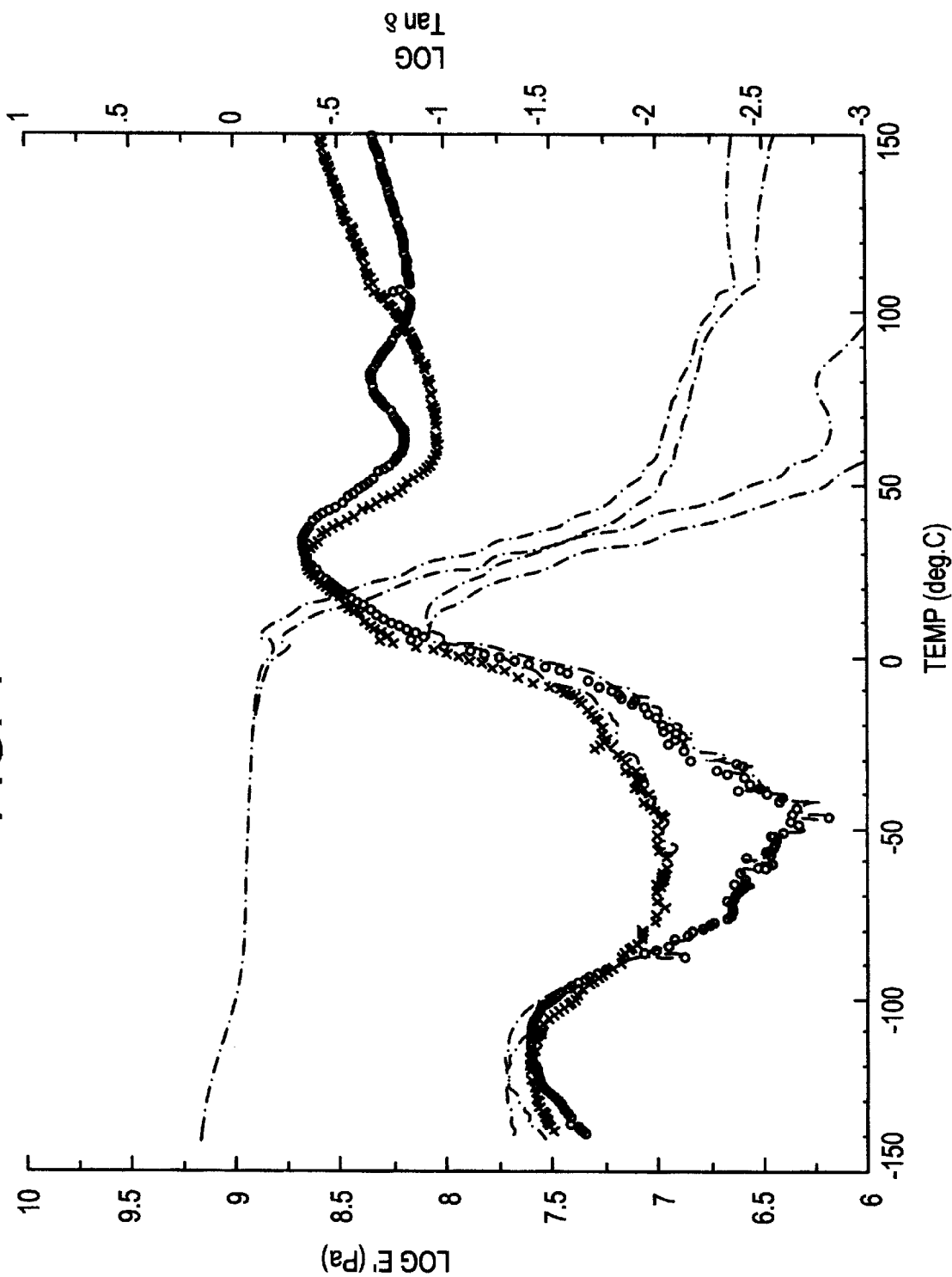
FIG. 1 illustrates a differential mechanical thermal analysis (DMTA) graph for the high $M_w$, low MWD ethylene-norbornene copolymer (ENB) of Example 15 according to the present invention. The storage modulus is plotted at 1 Hz (...) and 10 Hz (---); loss modulus at 1 Hz (...) and 10 Hz (---); and the tan(δ) value at 1 Hz (xxx) and 10 Hz (o-o-o).
Figure 2:
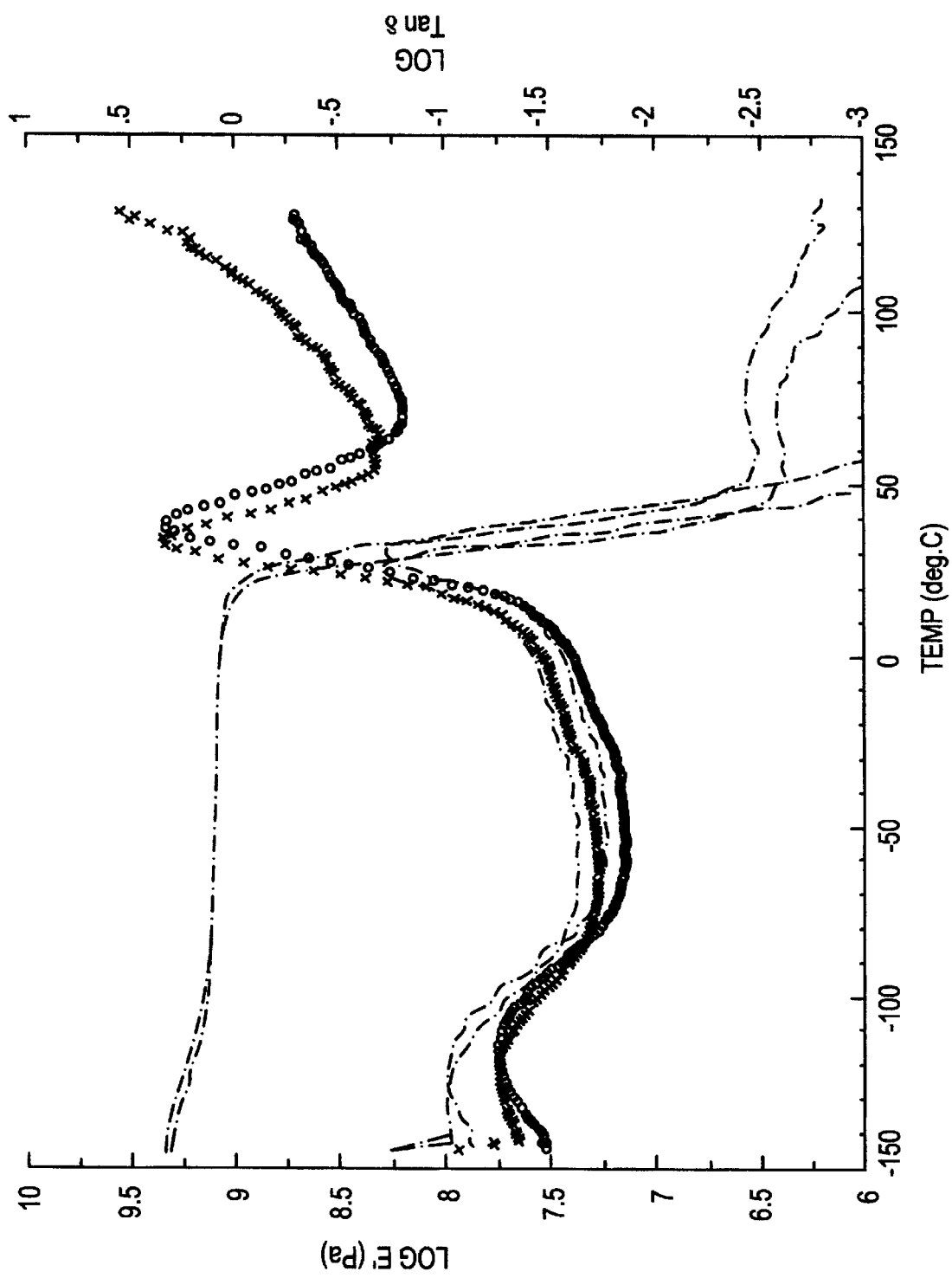
FIG. 2 illustrates a DMTA graph for the ENB of Example 8 to show the effect of a moderately lower $M_w$, plotting the storage modulus, loss modulus and the tan(δ) value as in FIG. 1.
Figure 3:
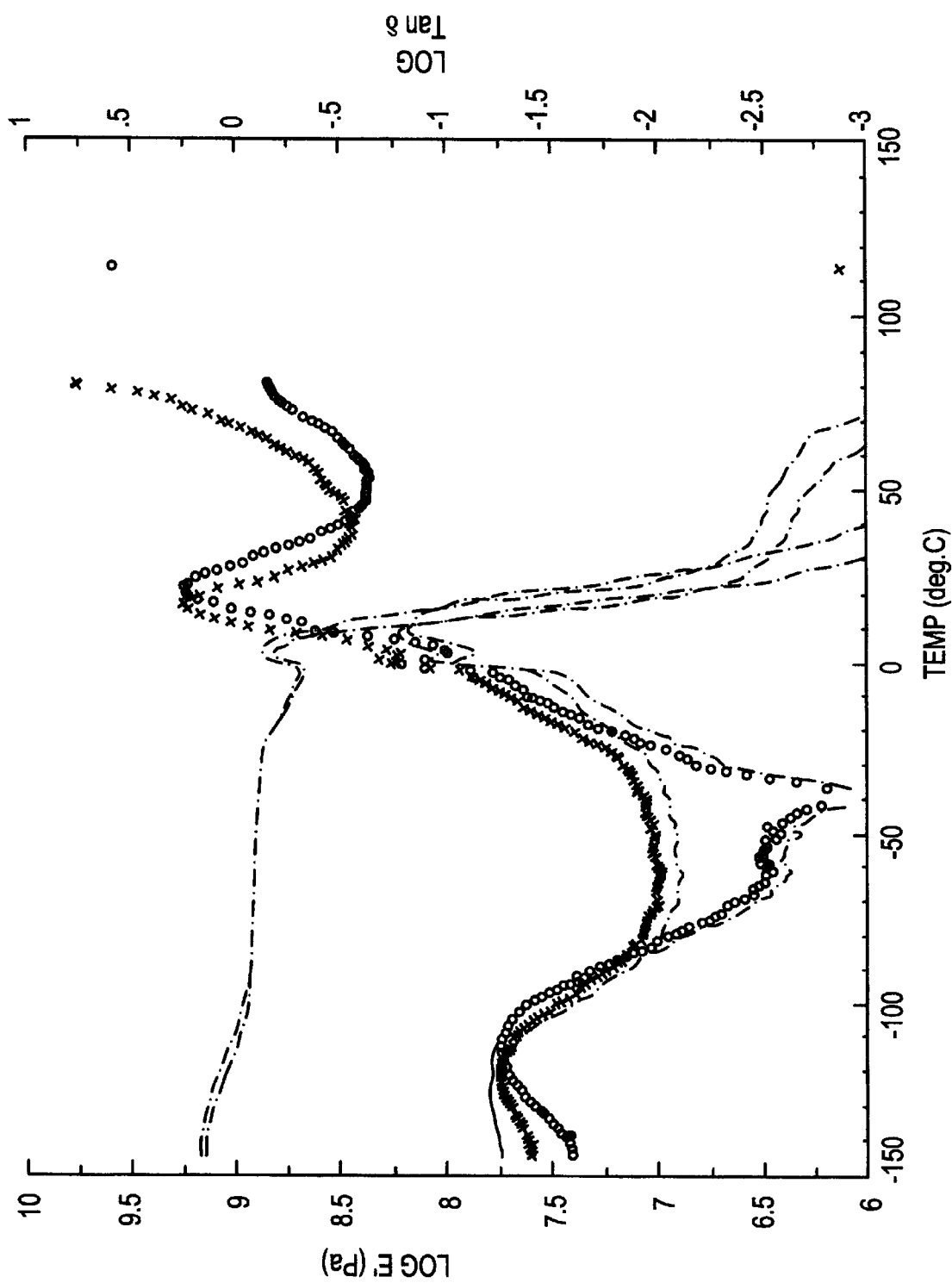
FIG. 3 illustrates a DMTA graph for the ENB of Example 10 to show the effect of low $M_w$, plotting the storage modulus, loss modulus and the tan(δ) value as in FIG. 1.
Figure 4:
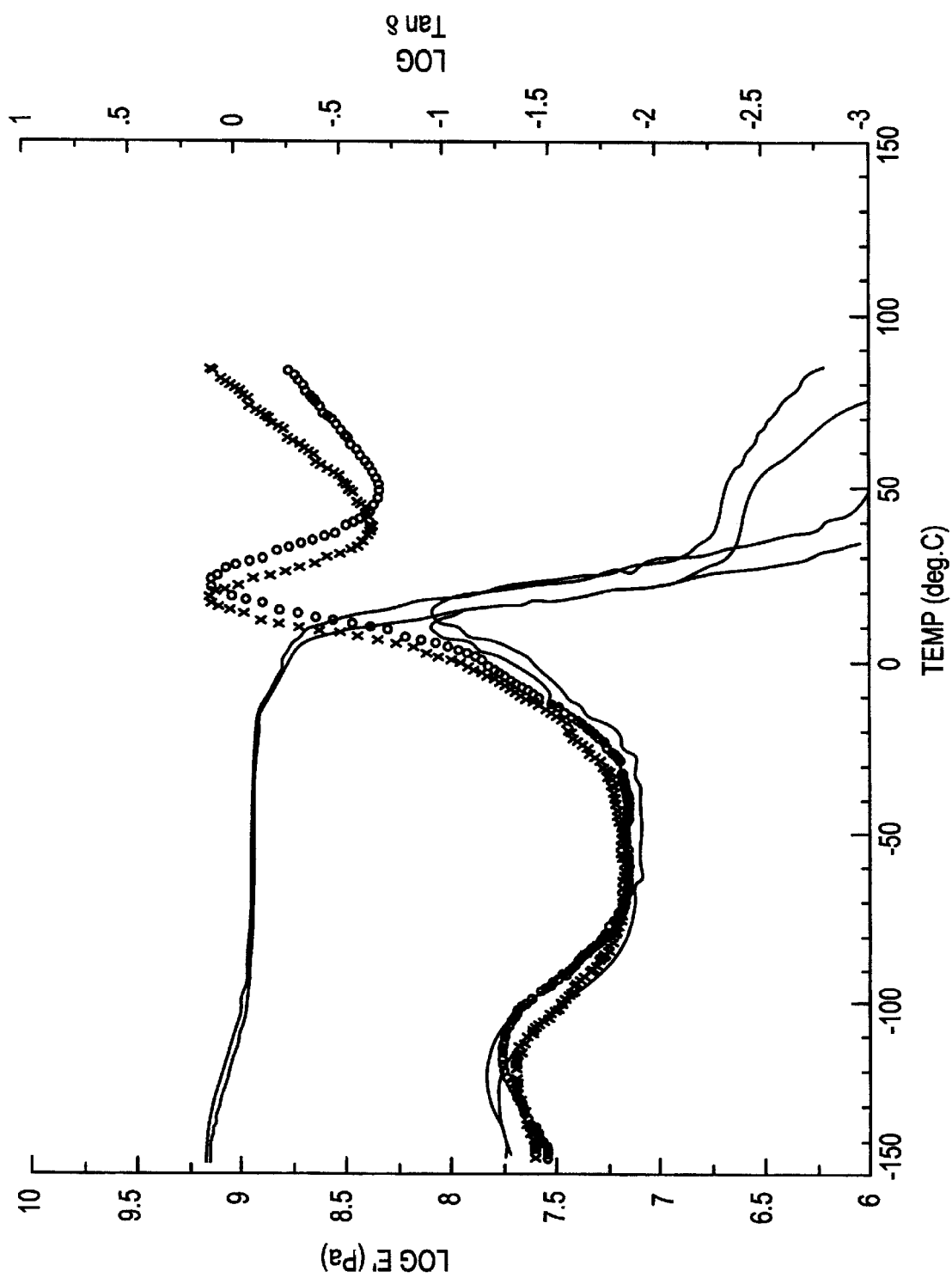
FIG. 4 illustrates a DMTA graph for the ENB of Example 1 to show the effect of high $M_w/M_n$ in a high $M_w$ copolymer, plotting the storage modulus, loss modulus and the tan(δ) value as in FIG. 1.

The present invention relates to copolymers which can be made, for example, by polymerizing cyclic olefin comonomers with one or more α-olefins in the presence of a coordination catalyst. The copolymers of the present invention have a surprisingly high molecular weight, preferably from about 30,000 to about 1,000,000 daltons or more. (As used herein, molecular weight refers to the weight average molecular weight ($M_w$) unless otherwise indicated.) The unique characteristics of the present copolymers are not generally observed at lower molecular weights, and polymers having a molecular weight higher than this range, while theoretically possible, are difficult to prepare as a practical matter, and are less easily processed. Most commercially useful copolymers, e.g. in film and molding applications, have $M_w$ in the range of from about 50,000 to about 500,000 daltons, most preferably up to 250,000.

The copolymers of the present invention can also have a relatively narrow molecular weight distribution (MWD). This surprising fact is reflected in a low polydispersity, i.e. a ratio of $M_w$ to number average molecular weight ($M_n$). The MWD ($M_w/M_n$) is generally less than about 4, preferably less than 2, and more preferably from about 1.2 to about 1.8, even in the copolymers of very high molecular weight.

The present copolymer generally comprises linear molecules having side chains which are cyclized with the main chain corresponding to the cyclic olefin which is copolymerized by addition/insertion of the unsaturated carbon-carbon double bond, usually without ring opening. This can be contrasted with the uncontrolled long chain branched polymers which are generally obtained by free-radically initiated, high pressure ethylene polymerization conventionally used to obtain low density polyethylene (LDPE). The present linear copolymers generally derive from the use of a single-site coordination catalyst in the present polymerization methodology as opposed to a free radical catalyst. The α-olefin and cyclic olefin polymerize in a predominantly head-to-tail fashion so that the polymer molecule has a generally linear main chain formed by polymerization at the carbon-carbon double bond, and a plurality of side chains of controlled size, cyclization, branching and unsaturation corresponding to the "tails" of the α-olefin, cyclic olefin, and any other comonomer which can optionally be present in a relatively minor proportion within the purview of this invention.

The cyclic olefin can generally comprise from about 5 to about 30 mole percent of the copolymer, but preferably comprises from about 10 to about 20 mole percent. At lower incorporation rates, the cyclic olefin does not substantially affect the properties of the poly(α-olefin). Conversely, at higher incorporation rates, the copolymer behaves too much like the poly(cyclic olefin). Thus, the proportion of cyclic olefin is essential to obtain the present copolymer having the rubbery and memory-retaining properties.

The cyclic olefin and α-olefin content of the copolymer are generally targeted to obtain the desired properties of the copolymer. The glass transition temperature ($T_g$), for instance, generally increases as the cyclic olefin content increases since homopolymers of the cyclic olefin generally have a higher Tg than homopolymers of the α-olefin. The copolymer preferably has a $T_g$ of from about −50° C. to 50° C., more preferably from about −10° C. to about 30° C. As used herein, $T_g$ is determined by differential scanning calorimetry (DSC) or dynamic mechanical thermal analysis (DMTA) according to procedures well known in the art.

The present copolymers have a number of properties which make them desirable in certain applications. The copolymers generally have good toughness and optical clarity, like homopolymers of ethylene, propylene and higher α-olefins, but also tend to have greater elasticity and recovery after elongation. However, the copolymers also have toughness and excellent tensile properties. As used herein, ultimate tensile strength, elongation at break, and recovery are determined at 25° C. using procedures in accordance with ASTM D-1708, unless otherwise noted. The copolymer preferably has an elongation at break of 300% or more, more preferably above 400%, and especially above 500%; a tensile strength at 150% elongation of at least 800 psi, preferably at least 1000 psi; an elastic recovery of at least 75% after 10 minutes relaxation from 150% elongation, more preferably recovery of at least 85%, and especially 90%. The copolymer preferably also has an ultimate tensile strength of at least 2500 psi, more preferably above 4000 psi.

The elasticity of the present copolymers can be extended over a relatively broad temperature range by controlling the $M_w$ and MWD. In general, the combination of a higher $M_w$ with a lower MWD tends to result in a copolymer which remains rubbery at temperatures above the approximate $T_g$ (as measured by DSC or DMTA) of the copolymer, for example, from the $T_g$ (−50° C. to 50° C.) to above 100° C., preferably above 150° C., as reflected by a rubbery storage modulus over this temperature range. To achieve this relatively high use temperature, the $M_w$ is at least 30,000, preferably at least 60,000, and especially at least 90,000; while the $M_w/M_n$ ratio is less than 2, preferably from 1.2 to 1.8. The rubbery storage modulus of the copolymers is readily observed as a plateau between about 1 and about 100 MPa by dynamic mechanical thermal analysis (DMTA) at a frequency of 1 or 10 Hz with a 2° C./min temperature ramp using commercially available DMTA equipment, for example, from Polymer Laboratories, Inc. If desired, the rubbery modulus can be extended to higher or lower temperatures by the optional use of crosslinking, plasticizing additives, or a combination of crosslinking and plasticizers. In general, plasticizers tend to lower the temperature at which the copolymer becomes brittle, while crosslinking raises the temperature at which the copolymer will flow or otherwise suffer a significant reduction in strength.

The α-olefin(s) which are copolymerized with the cyclic olefin(s) in the present invention can be any unsaturated, copolymerizable monomer having at least 2 carbon atoms, or mixture or combination thereof. Typically, the α-olefin is a substituted or unsubstituted $C_2$–$C_{20}$ α-olefin, such as, for example, ethylene, propylene, 1-butene, 1-pentene, 3-methyl-pentene-1, 4-methylpentene-1, 1-hexene, 1-heptene, 1-octene, 1-nonene, 1-decene, 1-undecene, 1-dodecene, 1-tetradecene, 1-hexadecene, 1-octadecene, 1-eicosene, allyltrimethyl silane, and the like; or vinyl aromatic and alicyclic monomers, such as, for example, styrene, alkyl-substituted styrene, vinyl cyclohexene, and the like. The α-olefin can also be (or include) a longer α-olefin (having 10 or more carbon atoms), a branched α-olefin or a polyene, or a combination thereof; either alone as the sole α-olefin comonomer(s), or more preferably as a termonomer in combination with a $C_2$–$C_{20}$ α-olefin, particularly a $C_2$–$C_8$ α-olefin, especially ethylene, propylene, or a mixture of ethylene and propylene.

As used herein, the terminology "α-olefin" is intended to refer generically to longer α-olefins, branched α-olefins and polyenes, as well as the more usual $C_2$–$C_{20}$ α-olefins. Also as used herein, the term "copolymer" is intended to refer in a broad sense to polymers containing two or more different monomers.

In general, any cyclic olefin can be copolymerized with the α-olefin in the present invention provided the cyclic olefin includes cyclized ethylenic or acetylenic unsaturation which undergoes addition polymerization in the presence of the catalyst (substantially without ring opening) so that the ring structure in which the unsaturation is present is incorporated into the polymer backbone. Suitable cyclic olefins generally correspond to one of the formulae:

1. 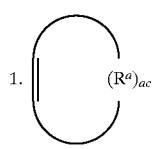 $(R^a)_{ac}$

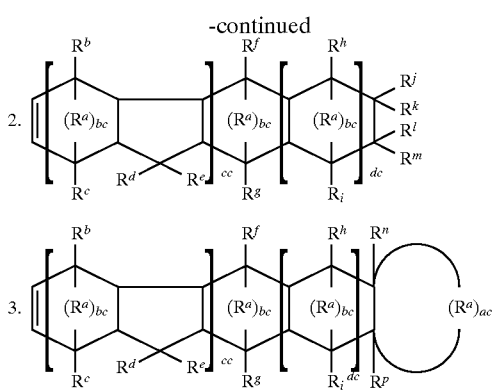

wherein each $R^a$ is independently a divalent radical comprising carbon, silicon, oxygen, nitrogen or boron, preferably $>C(R^q)R^r$, $>Si(R^q)R^r$, $>O$, $>NR^q$, $BR^q$, or a combination thereof, and especially $>C(R^q)R^r$; each $R^b$ through $R^r$ is independently hydrogen, halogen, hydrocarbyl, or halohydrocarbyl; ac and bc are integers of 1 or more, preferably 2 or more; and cc and dc are integers of 0 or more.

Specific representative cyclic olefins according to formula 1 are cyclobutene, cyclopentene, 3-methylcyclopentene, 4-methylcyclopentene, 3,4-dimethylcyclopentene, 3,5-dimethylcyclopentene, 3-chlorocyclopentene, cyclohexene, 3-methylcyclohexene, 4-methylcyclohexane, 3,4-dimethylcyclohexene, 3-chlorocyclohexene, cycloheptene, cyclododecene and the like. Preferred monocycloolefins according to formula 1 have from 4 to 12 carbon atoms, more preferably 6 to 8 carbon atoms.

Cyclic olefins according to formulae 2 and 3 can be prepared by condensing cyclopentadienes with the corresponding olefins and/or cycloolefins in a Diels-Alder reaction. Specific representative cyclic olefins according to formula 2 are as follows:

bicyclo(2.2.1)hept-2-ene;
6-methylbicyclo(2.2.1)hept-2-ene;
5,6-dimethylbicyclo(2.2.1)hept-2-ene;
1-methylbicyclo(2.2.1)hept-2-ene;
6-ethylbicyclo(2.2.1)hept-2-ene;
6-n-butylbicyclo(2.2.1)hept-2-ene;
6-isobutylbicyclo(2.2.1)hept-2-ene;
7-methylbicyclo(2.2.1)hept-2-ene;
5-phenylbicyclo(2.2.1)hept-2-ene;
5-methyl-5-phenylbicyclo(2.2.1)hept-2-ene;
5-benzylbicyclo(2.2.1)hept-2-ene;
5-tolylbicyclo(2.2.1)hept-2-ene;
5-ethylphenylbicyclo(2.2.1)hept-2-ene;
5-isopropylphenylbicyclo(2.2.1)hept-2-ene;
5-α-naphthylbicyclo(2.2.1)hept-2-ene;
5-acetoracenylbicyclo(2.2.1)hept-2-ene;
tetracyclo(4.4.0.1$^{2,5}$.1$^{7,10}$)-3-dodecene;
bicyclo(2.2.2)oct-2-ene;
1-methylbicyclo(2.2.2)oct-2-ene;
5,6-dimethylbicyclo(2.2.2)oct-2-ene;
7-methylbicyclo(2.2.2)oct-2-ene;
8-methylbicyclo(2.2.2)oct-2-ene;
2-methyltetracyclo(4.4.0.1$^{2,5}$.1$^{7,10}$)-3-dodecene;
2-ethyltetracyclo(4.4.0.1$^{2,5}$.1$^{7,10}$)-3-dodecene;
2-propyltetracyclo(4.4.0.1$^{2,5}$.1$^{7,10}$)-3-dodecene;
2-hexyltetracyclo(4.4.0.1$^{2,5}$.1$^{7,10}$)-3-dodecene;
2-stearyltetracyclo(4.4.0.1$^{2,5}$.1$^{7,10}$)-3-dodecene;
2,3-dimethyltetracyclo(4.4.0.1$^{2,5}$.1$^{7,10}$)-3-dodecene;
2-methyl-3-ethyltetracyclo(4.4.0.1$^{2,5}$.1$^{7,10}$)-3-dodecene;
2-chlorotetracyclo(4.4.0.1$^{2,5}$.1$^{7,10}$)-3-dodecene;
2-bromotetracyclo(4.4.0.1$^{2,5}$.1$^{7,10}$)-3-dodecene;
2,3-dichlorotetracyclo(4.4.0.1$^{2,5}$.1$^{7,10}$)-3-dodecene;
2-cyclohexyltetracyclo(4.4.0.1$^{2,5}$.1$^{7,10}$)-3-dodecene;
2-n-butyltetracyclo(4.4.0.1$^{2,5}$.1$^{7,10}$)-3-dodecene;
2-isobutyltetracyclo(4.4.0.1$^{2,5}$.1$^{7,10}$)-3-dodecene;
5,10-dimethyltetracyclo(4.4.0.1$^{2,5}$.1$^{7,10}$)-3-dodecene;
2,10-dimethyltetracyclo(4.4.0.1$^{2,5}$.1$^{7,10}$)-3-dodecene;
11,12-dimethyltetracyclo(4.4.0.1$^{2,5}$.1,$^{7,10}$)-3-dodecene;
2,7,9-trimethyltetracyclo(4.4.0.1$^{2,5}$.1$^{7,10}$)-3-dodecene;
9-ethyl-2,7-dimethyltetracyclo(4.4.0.1$^{2,5}$.1$^{7,10}$)-3-dodecene;
9-isobutyl-2,7-dimethyltetracyclo(4.4.0.1$^{2,5}$.1$^{7,10}$)-3-dodecene;
9,11,12-trimethyltetracyclo(4.4.0.1$^{2,5}$.1$^{7,10}$)-3-dodecene;
9-ethyl-11,12-dimethyltetracyclo(4.4.0.1$^{2,5}$.1$^{7,10}$)-3-dodecene;
9-isobutyl-11,12-dimethyltetracyclo (4.4.0.1$^{2,5}$.1$^{7,10}$)-3-dodecene;
5,8,9,10-tetramethyltetracyclo(4.4.0.1$^{2,5}$.1$^{7,10}$)-3-dodecene; 8-methyltetracyclo(4.4.0.1$^{2,5}$.1$^{7,10}$)-3-dodecene; 8-ethyltetracyclo(4.4.0.1$^{2,5}$.1$^{7,10}$)-3-dodecene; 8-propyltetracyclo(4.4.0.1$^{2,5}$.1$^{7,10}$)-3-dodecene; 8-hexyltetracyclo(4.4.0.1$^{2,5}$.1$^{7,10}$)-3-dodecene; 8-stearyltetracyclo(4.4.0.1$^{2,5}$.1$^{7,10}$)-3-dodecene;
8,9-dimethyltetracyclo(4.4.0.1$^{2,5}$.1$^{7,10}$)-3-dodecene;
8-methyl-9-ethyltetracyclo(4.4.0.1$^{2,5}$.1$^{7,10}$)-3-dodecene;
8-chlorotetracyclo(4.4.0.1$^{2,5}$.1$^{7,10}$)-3-dodecene;
8-bromotetracyclo(4.4.0.1$^{2,5}$.1$^{7,10}$)-3-dodecene;
8-fluorotetracyclo(4.4.0.1$^{2,5}$.1$^{7,10}$)-3-dodecene;
8,9-dichlorotetracyclo(4.4.0.1$^{2,5}$.1$^{7,10}$)-3-dodecene;
8-cyclohexyltetracyclo(4.4.0.1$^{2,5}$.1$^{7,10}$)-3-dodecene;
8-isobutyltetracyclo(4.4.0.1$^{2,5}$.1$^{7,10}$)-3-dodecene;
8-butyltetracyclo(4.4.0.1$^{2, 5}$.1$^{7,10}$)-3-dodecene;
8-ethylidenetetracyclo(4.4.0.1$^{2,5}$.1$^{7,10}$)-3-dodecene;
8-ethylidene-9-methyltetracyclo(4.4.0.1$^{2,5}$.1$^{7,10}$)-3-dodecene;
8-ethylidene-9-ethyltetracyclo(4.4.0.1$^{2,5}$.1$^{7,10}$)-3-dodecene;
8-ethylidene-9-isopropyltetracyclo (4.4.0.1$^{2,5}$.1$^{7,10}$)-3-dodecene;
8-ethylidene-9-butyltetracyclo(4.4.0.1$^{2,5}$.1$^{7,10}$)-3-dodecene;
8-n-propylidenetetracyclo(4.4.0.1$^{2,5}$.1$^{7,10}$)-3-dodecene;
8-n-propylidene-9-methyltetracyclo (4.4.0.1$^{2,5}$.1$^{7,10}$)-3-dodecene;
8-n-propylidene-9-ethyltetracyclo(4.4.0.1$^{2,5}$.1$^{7,10}$)-3-dodecene;
8-n-propylidene-9-isopropyltetracyclo (4.4.0.1$^{2,5}$.1$^{7,10}$)-3-dodecene;
8-n-propylidene-9-butyltetracyclo(4.4.0.1$^{2,5}$.1$^{7,10}$)-3-dodecene;
8-isopropylidenetetracyclo(4.4.0.1$^{2, 5}$.1$^{7,10}$)-3-dodecene;
8-isopropylidene-9-methyltetracyclo(4.4.0.1$^{2,5}$. 1$^{7,10}$)-3-dodecene;
8-isopropylidene-9-ethyltetracyclo(4.4.0.1$^{2,5}$. 1$^{7,10}$)-3-dodecene;

8-isopropylidene-9-isopropyltetracyclo(4.4.0.1$^{2,5}$.1$^{7,10}$)-3-dodecene;

8-isopropylidene-9-butyltetracyclo (4.4.0.1$^{2,5}$.1$^{7,10}$)-3-dodecene;

hexacyclo(6.6.1.1$^{3,6}$.1$^{10,13}$.0$^{2,7}$.0$^{9,14}$)-4-heptadecene;

12-methylhexacyclo(6.6.1.1$^{3,6}$.1$^{10,13}$.0$^{2,7}$.0$^{9,14}$)-4-heptadecene;

12-ethylhexacyclo(6.6.1.1$^{3,6}$.1$^{10,13}$.0$^{2,7}$.0$^{9,14}$)-4-heptadecene;

12-isobutylhexacyclo(6.6.1.1$^{3,6}$.1$^{10,13}$.0$^{2,7}$.0$^{9,14}$)-4-heptadecene;

1,6,10-trimethyl-12-isobutylhexacyclo (6.6.1.1$^{3,6}$.1$^{10,13}$.0$^{2,7}$.0$^{9,14}$)-4-heptadecene;

octacyclo(8.8.0.1$^{2,9}$.1$^{4,7}$.1$^{11,18}$.1$^{13,16}$.0$^{3,8}$.0$^{12,17}$)5-dococene;

15-methyloctacyclo(8.8.0.1$^{2,9}$.1$^{4,7}$.1$^{11,18}$.1$^{13,16}$. 0$^{3,8}$.0$^{12,17}$)-5-dococene; and 15-ethyloctacyclo(8.8.0.1$^{2,9}$.1$^{4,7}$.1$^{11,18}$.1$^{13,16}$.0$^{3,8}$.0$^{12,17}$)-5-dococene.

Specific representative cyclic olefins according to formula 3 are as follows:

tricyclo(4.3.0.1$^{2,5}$)-3-decene;
2-methyltricyclo(4.3.0.1$^{2,5}$)-3-decene;
5-methyltricyclo(4.3.0.1$^{2,5}$)-3-decene;
tricyclo(4.3.0.1$^{2,5}$)-7-decene;
2-methyltricyclo(4.3.0.1$^{2,5}$)-7-decene;
5-methyltricyclo(4.3.0.1$^{2,5}$)-3-decene;
tricyclo(4.4.0.1$^{2,5}$)-3-undecene;
10-methyltricyclo(4.4.0.1$^{2,5}$)-3-undecene;
pentacyclo(6.5.1.1$^{3,6}$.0$^{2,7}$.0$^{9,13}$)-4-pentadecene;
pentacyclo(4.7.0.1$^{2,5}$.0$^{8,13}$.1$^{9,12}$)-3-pentadecene;
7-methylpentacyclo(4.7.0.1$^{2,5}$.0$^{8,13}$.1$^{9,12}$)-3-pentadecene;
9-methylpentacyclo(4.7.0.1$^{2,5}$.0$^{8,13}$.1$^{9,12}$)-3-pentadecene;
10-methylpentacyclo(4.7.0.1$^{2,5}$.0$^{8,13}$.1$^{9,12}$)-3-pentadecene;
11-methylpentacyclo(4.7.0.1$^{2,5}$.0$^{8,13}$.1$^{9,12}$)-3-pentadecene;
12-methylpentacyclo(4.7.0.1$^{2,5}$.0$^{8,13}$.1$^{9,12}$)-3-pentadecene;
13-methylpentacyclo(4.7.0.1$^{2,5}$.0$^{8,13}$.1$^{9,12}$)-3-pentadecene;
1,3-dimethylpentacyclo(6.5.1.1$^{3,6}$.0$^{2,7}$.0$^{9,13}$)-4-pentadecene;
1,6-dimethylpentacyclo(6.5.1.1$^{3,6}$.0$^{2,7}$.0$^{9,13}$)-4-pentadecene;
14,15-dimethylpentacyclo(6.5.1.1$^{3,6}$.0$^{2,7}$.0$^{9,13}$)-4-pentadecene;
pentacyclo(6.6.1.1$^{3,6}$.0$^{2,7}$.0$^{9,14}$)-4-hexadecene;
15 1,3-dimethylpentacyclo(6.6.1.1$^{3,6}$.0$^{2,7}$.0$^{9,14}$)-4-hexadecene;
1,6-dimethylpentacyclo(6.6.1.1$^{3,6}$.0$^{2,7}$.0$^{9,14}$)-4-hexadecene;
15,16-dimethylpentacyclo(6.6.1.1$^{3,6}$.0$^{2,7}$.0$^{9,14}$)-4-hexadecene;
heptacyclo(8.7.0.1$^{2,9}$.1$^{4,7}$.1$^{11,17}$.0$^{3,8}$.0$^{12,16}$)-5-eicosene;
heptacyclo(7.8.0.1$^{3,6}$.0$^{2,7}$.1$^{10,17}$.0$^{11,16}$.1$^{12,15}$)-4-eicosene;
heptacyclo(8.8.0.1$^{2,9}$.1$^{4,7}$.1$^{11,18}$.0$^{3,8}$.0$^{12,17}$)-5-heneicosene;
nonacyclo(9.10.1.1$^{4,7}$.0$^{3,8}$.0$^{2,10}$.0$^{12,21}$.1$^{13,20}$. 0$^{14,19}$.1$^{15,18}$)-5-pentacosene; and
cyclopentadiene-acenaphthylene adduct.

Especially preferred cyclic olefins include cyclobutene, cyclopentene, deltacyclene, norbornene, methylnorbornene, tetracyclododecene, methyltetracyclododecene, dimethyltetracyclododecene, tricyclo(4.3.0.1$^{2,5}$)-3-decene, and pentacyclo-(4.7.0.1.$^{2,5}$.0$^{8,13}$.1$^{9,12}$)-3-pentadecene. Of these, norbornene is preferred for its ready commercial availability and effectiveness.

Polyenes having two or more double bonds can optionally be used in a relatively minor proportion to impart higher molecular weight to the copolymer and/or provide residual pendant side chain unsaturation for functionalization or crosslinking. Where the polyenes can participate in polymerization at two (or more) sites, these monomers tend to promote chain extension which can double or quadruple the molecular weight at low incorporation rates, and also raise the upper temperature at which the rubbery storage modulus plateau is present. Ideally the polyene is not present in such high amounts which might result in excessive crosslinking and produce insoluble gel formation. Preferably, the molecular weight is suitably increased by including the optional polyene in the copolymer at from 0.5 to 3 mole percent.

Suitable chain-extending, molecular-weight-increasing polyenes include, for example, α,ω-dienes having from 5 to 18 carbon atoms, such as 1,4-pentadiene, 1,5-hexadiene, 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, 1,14-pentadecadiene, 1,15-hexadecadiene, 1,16-heptadecadiene, 1,17-octadecadiene, or the like.

When two (or more) of the double bonds are sufficiently reactive under the particular reaction conditions to participate in the polymerization reaction, suitable optional polyenes generally also include other linear or branched aliphatic dienes and trienes, monocyclic dienes and trienes, bicyclic dienes and trienes, polycyclic dienes, aromatic dienes, and the like. Specific representative examples of non-conjugated polyenes include 1,4-hexadiene, 6-methyl-1,4-heptadiene, 4-isopropyl-1,4-hexadiene, 4-methyl-1,4-hexadiene, 5-methyl-1,4-hexadiene, 4-ethyl-1,4-hexadiene, 4-isopropyl-1,4-hexadiene, 6-phenyl-4-propyl-1,4-hexadiene, 4,5-dimethyl-1,4-hexadiene, 6-phenyl-1,4-hexadiene, 5-methyl-1,5-octadiene, 6-methyl-1,5-octadiene, 6-methyl-1,5-heptadiene, 5,7-dimethyl-1,5-octadiene, 4,5-dipropyl-1,4-octadiene, 5-propyl-6-methyl-1,5-heptadiene, 5-ethyl-7-methyl-1,6-octadiene, 1,5-hexadiene, 1,6-heptadiene, 1,6-octadiene, 1,7-octadiene, 1,8-nonadiene, 1,8-decadiene, 1,9-decadiene, and 1,10-undecadiene; dicyclopentadiene, tricylopentadiene, 1-vinyl-4-(1-propenyl)-cyclohexane, 4-methylcyclo-1,4-octadiene, 4-methyl-5-propylcyclo-1,4-octadiene, 5-methylcyclopentadiene, 4-methyl-5-ethyldicyclopentadiene, 5-isopropyldicyclopentadiene, 1,5,9-cyclododecatriene, 4-(1-butenyl-2)-styrene, 4-2-buten-2-yl)-styrene and trans-1,2-divinylcyclobutane, 5-ethylidenenorbornene-2, 5-propylidenenorbornene-2,5-butylidenenorbornene-2, 5-isopropylidene-norbornene-2,2-methyl-2,5-norbornadiene, 5-methyl-2,5-norbornadiene, 2-propyl-2,5-norbornadiene, 5-methylene-2-norbornene, 5-(2-butenyl)-2-norbornene, 3-heptyl-2,5-norbornadiene, 2-ethyl-3-propyl-2,5-norbornadiene, 2-(1', 5'-dimethylhexene-4-yl)-2,5-norbornadiene, dicyclopentadiene, 5-isopropyldicyclopentadiene, 5-isopropylidene-bicyclo(2.2.2)octene-2, 5-ethylidenebicyclo(2.2.2)octene-2, 5-butylidenebicyclo (2.2.2)octene-2, 2-ethylbicyclo(2.2.2)octadiene-2,5, 2-methyl-3-ethyl-bicyclo(2.2.2)octadiene-2,5, 2-hexylbicyclo(2.2.2)octadiene-2,5, 2-(1', 5'-dimethylhexenyl-4)bicyclo(2.2.2)octadiene-2,5, 1-isopropylidenebicyclo(4.4.0)decadiene-2,6, 2-isopropylidenebicyclo(4.4.0)decene-6, 2-ethylidenebicyclo(4.4.0)decene-6, 3-ethylidenebicyclo(3.2.0) heptadiene-2,6, 3-methylbicyclo(3.3.0)octadiene-2,6, 3-methyltetrahydroindene, 5 6-methyltrahydroindene, 2-propyltetrahydroindene, 1-isopropylidenetetrahydroindene, 1-(1'-phenyl)-ethylidenetetrahydroindene and the like.

In a preferred embodiment, the polymerization methodology is practiced in the manner and with the ionic catalysts referred to, disclosed, and described in the following references:

| U.S. Pat. Nos. | Issue Date |
| --- | --- |
| 5,055,438 | October 8, 1991 |
| 5,057,475 | October 15, 1991 |
| 5,096,867 | March 17, 1992 |
| 5,017,714 | May 21, 1991 |
| 5,153,157 | October 6, 1992 |
| U.S. Patent Application Ser. Nos. | Filing Date |
| 468,382 | February 28, 1990 |
| 542,236 | June 22, 1990 |
| 737,611 | July 19, 1991 |
| 885,170 | May 18, 1992 |
| 926,006 | August 5, 1992 |
| European Published Application Nos. | Publication Date |
| 129,368 | December 27, 1984 |
| 277,003 | June 3, 1988 |
| 277,004 | June 3, 1988 | which are hereby incorporated herein by reference.

Generally, the preferred catalyst systems employed in preparing the copolymer of the invention can comprise a complex formed upon admixture of a Group 4 transition metal component with an activating component. The catalyst system can be prepared by addition of the requisite transition metal and alumoxane components, or a previously cationically activated transition metal component, to an inert solvent in which olefin polymerization can be carried out by a solution, slurry or bulk phase polymerization procedure.

Optimum results are generally obtained wherein the Group 4 transition metal compound is present in the polymerization diluent, in a concentration of preferably from abut 0.00001 to about 10.0 millimoles/liter of diluent and the activating component is present in an amount to provide a molar activating component to transition metal ratio of from about 0.5:1 to about 2:1 or more, and in the case of alumoxane, the molar alumoxane to transition metal can be as high as 20,000:1. Sufficient solvent is normally used so as to provide adequate heat transfer away from the catalyst components during reaction and to permit good mixing.

The catalyst system ingredients, that is, the transition metal, the alumoxane and/or ionic activators, and polymerization diluent can be added to the reaction vessel rapidly or slowly. The temperature maintained during the contact of the catalyst components can vary widely, such as, for example, from −100° C. to 300° C. Greater or lesser temperatures can also be employed. Preferably, during formation of the catalyst system, the reaction is maintained within a temperature of from about 25° C. to 100° C., most preferably about 25° C.

In a preferred embodiment, the catalyst system is utilized in the liquid phase (slurry, solution, suspension or bulk phase or combination thereof), high pressure fluid phase or gas phase (where the α-olefin and cyclic olefin are sufficiently volatile, e.g. up to $C_8$) copolymerization of α-olefin and cyclic olefin. These processes may be employed singularly or in series. The liquid phase process comprises the steps of contacting α-olefin and cyclic olefin with the catalyst system in a suitable polymerization diluent and reacting said monomers in the presence of said catalyst system for a time and at a temperature sufficient to produce a copolymer of high molecular weight. Conditions most preferred for the copolymerization of α-olefin are those wherein α-olefin is submitted to the reaction zone at pressures of from about 0.019 psi to about 50,000 psi and the reaction temperature is maintained at from about −100° C. to about 300° C. The reaction time is preferably from about 10 seconds to about 4 hours.

One example of polymerization for production of the α-olefin/cyclic olefin copolymer is as follows: in a stirred-tank reactor liquid comonomer is introduced, such as 2-norbornene. The catalyst system is introduced via nozzles in either the vapor or liquid phase. Feed ethylene (or other olefin) gas is introduced either into the vapor phase of the reactor, or sparged into the liquid phase as is well known in the art. The reactor contains a liquid phase composed substantially of liquid comonomer, together with dissolved ethylene gas, and a vapor phase containing vapors of all monomers. The reactor temperature and pressure may be controlled via reflux of vaporizing comonomer (autorefrigeration), as well as by cooling coils, jackets etc. The polymerization rate is generally controlled by the concentration of catalyst. The ethylene and comonomer contents of the polymer product are determined by the ratio of ethylene to comonomer in the reactor, which are controlled by manipulating the relative feed rates of these components to the reactor.

Alternatively, the α-olefin/cyclic olefin copolymer can be prepared by a high pressure process. The high pressure polymerization is completed at a temperature from about 105° C. to about 350° C., preferably from about 120° C. to about 250° C., and at a pressure of from about 100 bar to about 3200 bar, preferably from about 200 bar to about 1300 bar, in a tubular or stirred autoclave reactor. After polymerization and catalyst deactivation, the product copolymer can be recovered using conventional equipment for polymer recovery, such as, for example, a series of high and low pressure separators wherein unreacted α-olefin, and unreacted cyclic olefin in some instances, particularly when the comonomer is relatively volatile, can be flashed off for recycle to the reactor and the polymer obtained extruded in an underwater pelletizer. An advantage of the high pressure process is that the flashing off of the cyclic olefin is relatively effective, particularly at the ratio of cyclic olefin: α-olefin used in the copolymerization to obtain the desired comonomer incorporation in the copolymer. Pigments, antioxidants and other known additives, as are known in the art, can be added to the polymer.

The copolymerization process can be a continuous or batch reaction. Typically, the continuous process, where reactants are continuously fed to the reactor and product continuously withdrawn, is preferred in commercial production facilities for economic reasons. The continuous process also has the advantage of promoting more uniform comonomer incorporation into the polymer.

As before noted, any suitable coordination catalyst system can be used. Preferably, however, the catalyst system has the ability to incorporate a relatively high content of The catalyst preferably has a relatively low α-olefin:cyclic olefin reactivity ratio less than about 300, more preferably less than 100, and especially from about 25 to about 75. Accordingly, the selection of the transition metal component, and other catalyst system components, is another parameter which may be utilized as a control over the α-olefin content of a copolymer with a reasonable ratio of α-olefin to cyclic olefin feed rates.

EXAMPLES

Norbornene Copolymerization Examples 1–16

Polymerization was done in a 1-liter or 2-liter autoclave reactor equipped with a paddle stirrer, an external water or steam jacket for temperature control, a regulated supply of dry nitrogen, ethylene, propylene, toluene and hexane, and a septum inlet for introduction of comonomer, transition metal compound, co-catalyst and scavenger solutions. The reactor was dried and purged thoroughly prior to use. A typical run consisted of injecting a quantity of cyclic olefin (typically in toluene or a hexanes solvent), and the ethylene or propylene monomer (as a liquid or gas). The reactor was then heated to between 30° C.–80° C. and a toluene solution of the transition metal compound, previously activated by the co-catalyst, was introduced into the system by cannula using high pressure nitrogen. The polymerization reaction was generally conducted for 10 to 120 minutes. The reaction was halted by rapidly cooling and venting the system. The resulting polymer was recovered by precipitation in methanol and/or isopropanol, filtration and drying the polymer in vacuo for about 12–48 hours at ambient temperature up to 50° C.

The co-catalysts were methylalumoxane (MAO), or dimethylanilinium tetra(perfluorophenyl)borate (DMAH B(pfp$_4$)). Scavengers, when used, were 2.0 molar solutions of diethyl aluminum chloride (DEAC), trimethyl aluminum (TMA) or triethyl aluminum (TEA). The following transition metal compounds (TMC) were used:

| CATALYST DESIGNATION | TRANSITION METAL COMPOUND (TMC) |
|---|---|
| A | Me$_2$Si bis (Ind.) HfMe$_2$—dimethylsilyl bis (indenyl) hafnium dimethyl |
| B | Me$_2$Si (C$_5$Me$_4$) (NC$_{12}$H$_{23}$) TiCl$_2$—dimethylsilyl (tetramethyl-cyclopentadienyl) (amidocyclododecyl) titanium dichloride |
| C | Cp$_2$ZrMe$_2$—bis (cyclopentadienyl) zirconium dimethyl |
| D | Me$_2$Si (H$_4$Indenyl) ZrCl$_2$—dimethylsilyl bis (tetrahydroindenyl) zirconium dichloride |

Table 1 gives the process conditions and yield. Process run data include the type and active amount of transition metal catalyst (TMC), co-catalyst, and scavenger (if any), the kind of solvent (if any), the amount of ethylene (psi) or propylene (ml or psi) monomers and norbornene comonomer, the polymerization temperature, and reaction time. Results are presented in terms of polymer yield.

For an example of a typical ethylene/norbornene copolymerization (see Example 1 in Table 1), 15.5 g norbornene dissolved in 400 mL hexanes were added to the reactor described above. Ethylene was introduced to a pressure of 50.0 psig and the reactor was heated (30° C.) and stirred. The metallocene (23.0 mg) (a molar excess) and 9.6 of the non-coordinating anion (DMAH B(pfp$_4$)) were mixed in toluene (2–3 mL) until the CH$_4$ stopped bubbling off. This two-phase oil/toluene mixture was sealed in a vial with septa, the vial was connected to the reactor via cannula and then pressurized with N$_2$ in the reactor. The polymerization reaction was conducted for 19 minutes, yielding 3.91 g of copolymer.

TABLE 1

| Example | TMC Type | Active TMC Amt (mg) | Co-cat. Type | Reactor Solvent | Reactor Temp. (°C.) | α-Olefin | α-Olefin Amt. (psi or ml) | Norbornene Amt. (g) | Run Time (min) | Yield (g) |
|---|---|---|---|---|---|---|---|---|---|---|
| 1 | C | 4.11 | DMAH B(pfp)4 | Hexane | 30.0 | Ethylene | 50.0 | 15.5 | 19.0 | 3.91 |
| 2 | C | 3.01 | DMAH B(pfp)4 | Hexane | 40.0 | Ethylene | 47.0 | 15.5 | 23.0 | 17.00 |
| 3 | C | 3.99 | DMAH B(pfp)4 | Hexane | 45.0 | Ethylene | 22.0 | 15.5 | 23.0 | 8.00 |
| 4 | C | 3.33 | DMAH B(pfp)4 | Hexane | 45.0 | Ethylene | 50.0 | 15.5 | 20.0 | 13.72 |
| 5 | D | 3.5 | MAO | Toluene | 80.0 | Ethylene | 50.0 | 31.0 | 36.0 | 45.7 |
| 6 | B | 12.3 | MAO | Hexane | 40.0 | Propylene | 102.0 psi | 9.7 | 24.0 | 7.60 |
| 7 | B | 13.3 | MAO | Propylene | 40.0 | Propylene | 300.0 ml | 10.0 | 28.0 | 17.20 |
| 8 | B | 15.4 | MAO | Hexane | 45.0 | Ethylene | 50.0 | 10.3 | 29.0 | 9.20 |
| 9 | A | 62.0 | DMAH B(pfp)4 | Hexane | 40.0 | Ethylene | 50.0 | 10.3 | 28.0 | 8.10 |
| 10 | C | 5.90 | DMAH B(pfp)4 | Hexane | 40.0 | Ethylene | 50.0 | 14.2 | 55.0 | 5.58 |
| 11 | C | 16.8 | DMAH B(pfp)4 | Toluene | 40.0 | Ethylene | 50.0 | 5.0 | 7.0 | 5.60 |
| 12* | A | 83.8 | DMAH B(pfp)4 | Toluene | 40.0 | Ethylene | 11.2 | 5.1 | 32.0 | 8.58 |
| 13*** | A | 38.0 | DMAH B(pfp)4 | Toluene | 40.0 | Ethylene | 12.7 | 5.4 | 12.0 | 12.00 |
| 14* | A | 79.0 | DMAH B(pfp)4 | Toluene | 40.0 | Ethylene | 16.5 | 7.2 | 75.0 | 20.00 |
| 15* | A | 50.4 | DMAH | Toluene | 40.0 | Ethylene | 13.4 | 8.2 | 96.0 | 19.05 |

TABLE 1-continued

| Example | TMC Type | Active TMC Amt (mg) | Co-cat. Type | Reactor Solvent | Reactor Temp. (°C.) | α-Olefin | α-Olefin Amt. (psi or ml) | Norbornene Amt. (g) | Run Time (min) | Yield (g) |
|---|---|---|---|---|---|---|---|---|---|---|
| 16** | A | 48.8 | B(pfp)4 DMAH B(pfp)4 | Toluene | 60.0 | Ethylene | 32.0 | 15.2 | 65.0 | 26.90 |

*50 ul TMA used as scavenger.
**200 ul TEA used as scavenger.
***100 ul TMA used as scavenger.

For an example of a typical propylene/norbornene copolymerization (see Example 6 in Table 1), 9.7 g norbornene dissolved in 400 mL hexanes were added to the reactor described above. Propylene (102 ml) was added using $N_2$ pressure and the reactor was stirred and heated to 40° C. The catalyst solution containing 12.3 mg metallocene and 7.0 mg of MAO in toluene was mixed before adding to the reactor by cannula. The polymerization was conducted for 24 minutes, after which time the reaction was halted by rapidly cooling and venting the system. The resulting polymer (7.6 g) was recovered by precipitating the viscous solution into MeOH, filtering through a medium or course frit, and drying in vacuum as stated above.

The copolymers were selectively tested for norbornene content by carbon nuclear magnetic resonance (CNMR) and/or proton NMR (HNMR); molecular weight ($M_w$) and molecular weight distribution ($M_w/M_n$) by gel permeation chromatography; and glass transition temperature ($T_g$) by differential scanning calorimetry (DSC) and/or dynamic mechanical thermal analysis (DMTA). The DMTA was done on a Polymer Laboratories, Inc. DMTA apparatus using a single cantilever head and a 2° C./min. temperature ramp according to the manufacturer's recommended procedures at 1 Hz and 10 Hz from −120° C. to 150° C. Some of the copolymer specimens were also tested for physical properties such as ultimate tensile strength; elongation at break; tensile strength at 150% strain; and recovery (100 minus tension set) after holding the specimen at 150% elongation for ten minutes and allowing the specimen to relax for ten minutes. Ultimate properties were measured on an Instron tensile testing apparatus at 4 in./min. (200%/min.), and the recovery data at 20 in./min. (1000%/min.). Testing was at ambient conditions unless otherwise indicated. The results are presented in Table 2.

TABLE 2

| Example | Comonomer Content (mol %) (CNMR) | $M_w$ | $M_w/M_n$ | $T_g$ (°C.) (DMTA) | Tensile Strength (psi) | Elongation at Break (%) | Tensile Strength at 150% Strain (psi) | Ten Minute Recovery (%) | Density (g/ml) |
|---|---|---|---|---|---|---|---|---|---|
| 1 | 15.6 | 165,000 | 6.4 | 25 | N/A | N/A | N/A | 91.8 | N/A |
| 2 | 11.9 | 83,000 | 2.1 | 23 | 3,140 | 535 | 997 | 88.0 | 0.950 |
| 3 | 13.6 | 160,000 | 6.6 | 24 | 4,050 | 592 | 1,450 | 92.0 | 0.950 |
| 4 | 11.6 | 50,000 | 1.93 | 21 | 4,090 | 547 | 1,120 | 93.0 | 0.950 |
| 5 | 15.0 | 29,000 | 1.85 | 32 | 4,170 | 380 | 2,070 | 69.0 | 0.970 |
| 6** | 11.4$^H$ | 181,000 | 1.64 | 22 | 1,120 | 840 | 200 | 100.0 | 0.905 |
| 7** | N/A | 313,000 | 1.77 | N/A | N/A | N/A | N/A | N/A | N/A |
| 8 | 24.7$^H$ | 90,000 | 1.75 | 40 | 5,140 | 295 | 2,480 | 96.0 | 0.987 |
| 9 | N/A | 249,000 | 1.53 | 33 | 4,050 | 314 | 1,640 | 100.0 | 0.967 |
| 10 | N/A | 39,600 | 1.43 | 21 | N/A | N/A | N/A | N/A | 0.962 |
| 11 | 9.94$^H$ | 30,200 | 1.83 | 9* | N/A | N/A | N/A | N/A | N/A |
| 12 | 15.62$^H$ | 171,000 | 1.33 | 10* | N/A | N/A | N/A | N/A | N/A |
| 13 | 19.13$^H$ | 106,000 | 1.22 | 18.5* | N/A | N/A | N/A | N/A | N/A |
| 14 | N/A | 336,000 | 1.96 | −2* | N/A | N/A | N/A | N/A | N/A |
| 15 | 14.8$^H$ | 251,000 | 1.79 | 32 | 5,222 | 410 | 1,450 | 91.0 | 0.952 |
| 16 | 24.7$^H$ | 160,000 | 2.18 | 30 | N/A | N/A | N/A | N/A | N/A |

N/A = Data not available
*Measured by DSC (otherwise DMTA)
**Propylene-norbornene copolymer
H = Measured by HMNR (otherwise CNMR)

The DMTA plots for the copolymers of Examples 15, 8, 10 and 1 are presented in FIGS. 1–4, respectively. All of these copolymers are rubbery, but the Example 15 copolymer has a rubbery storage modulus, i.e. a storage modulus between $10^6$ and $10^8$ Pa, which plateaus from about 40° C. to above 150° C. (the upper temperature limit of the DMTA). This means that copolymers similar to Example 15, having a similar norbornene content, high Mw, and narrow MWD, can have a relatively high use temperature since they remain rubbery at elevated temperatures. However, when the Mw is moderately lowered, as in the copolymer of Example 8, the storage modulus plateau tends to taper off at a lower temperature (but is still above about 100° C.) (see FIG. 2); when the Mw is lowered to around 39,000, the rubbery plateau tends to drop off at a markedly lower temperature as in the copolymer of Example 10 (see FIG. 3). Similarly, even though the Mw may be high, when the MWD is relatively broad, as in the copolymer of Example 1, the rubbery plateau will also drop off at a lower temperature. Thus, the Mw and MWD will have a significant effect on the upper temperature limit of the rubbery storage modulus plateau and the use temperature of the copolymer.

Figure 5:
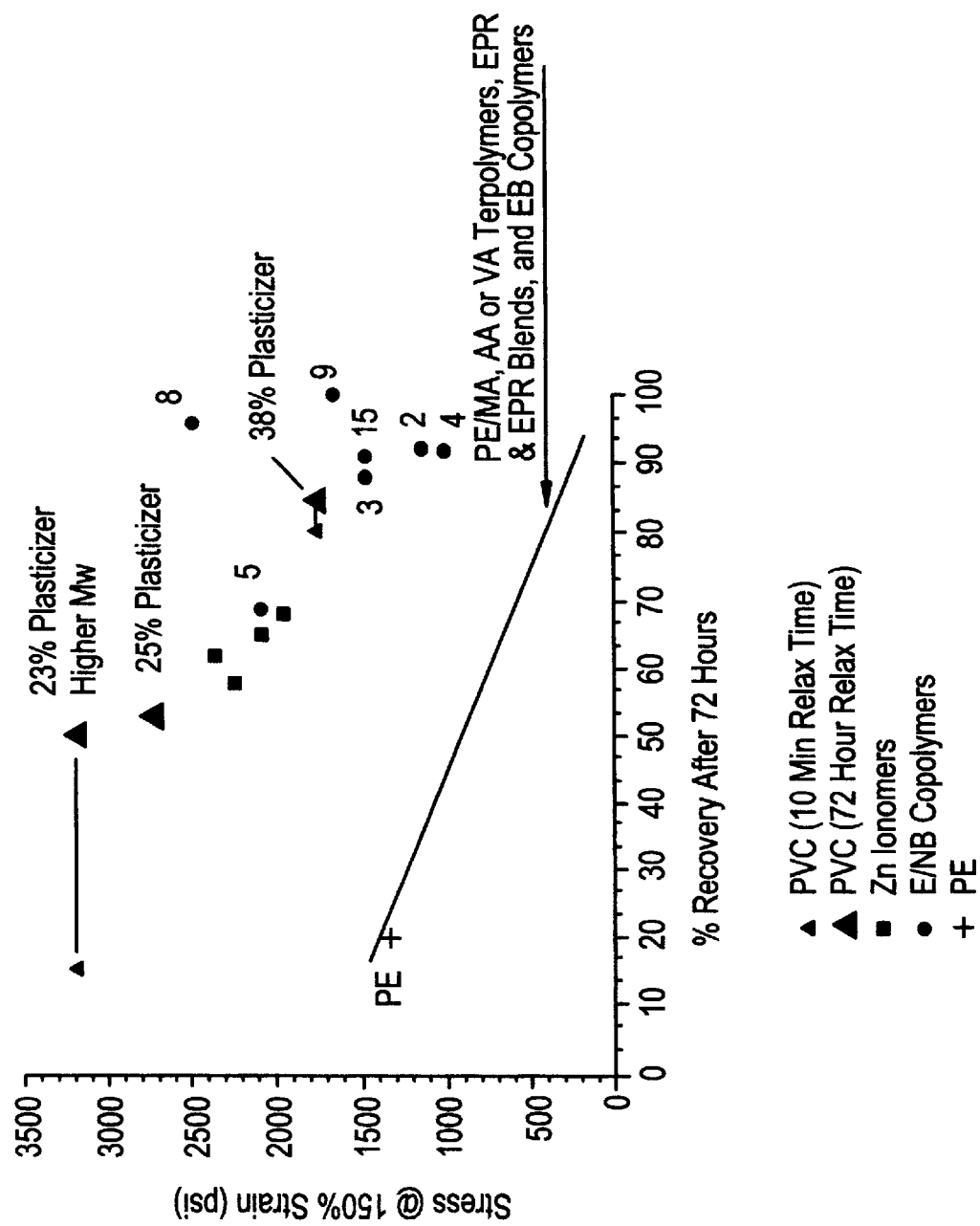
FIG. 5 shows the recovery and strength properties of ethylene-norbornene copolymers of the present invention (●) as compared to various other polymers, including 25% Plasticized PVC (Δ-Δ); copolymers of ethylene with acrylic acid, methyl acrylate and/or vinyl acetate, ethylene-propylene rubbers and blends with polyethylene, and ethylene-butene copolymers (−); Zn ionomers of ethylene-acrylic acid copolymers (■); and low density polyethylene (+); with stress measured at 150% strain, and percent recovery measured as change in dimension following 150% elongation for 10 minutes and a specified relaxation time. All data were obtained with a modified ASTM procedure D-1708 using 0.187 in. wide, 20 mil thick compression molded specimens, and a strain rate of 20 in./min with a 0.9 in. gap length.
Figure 6:
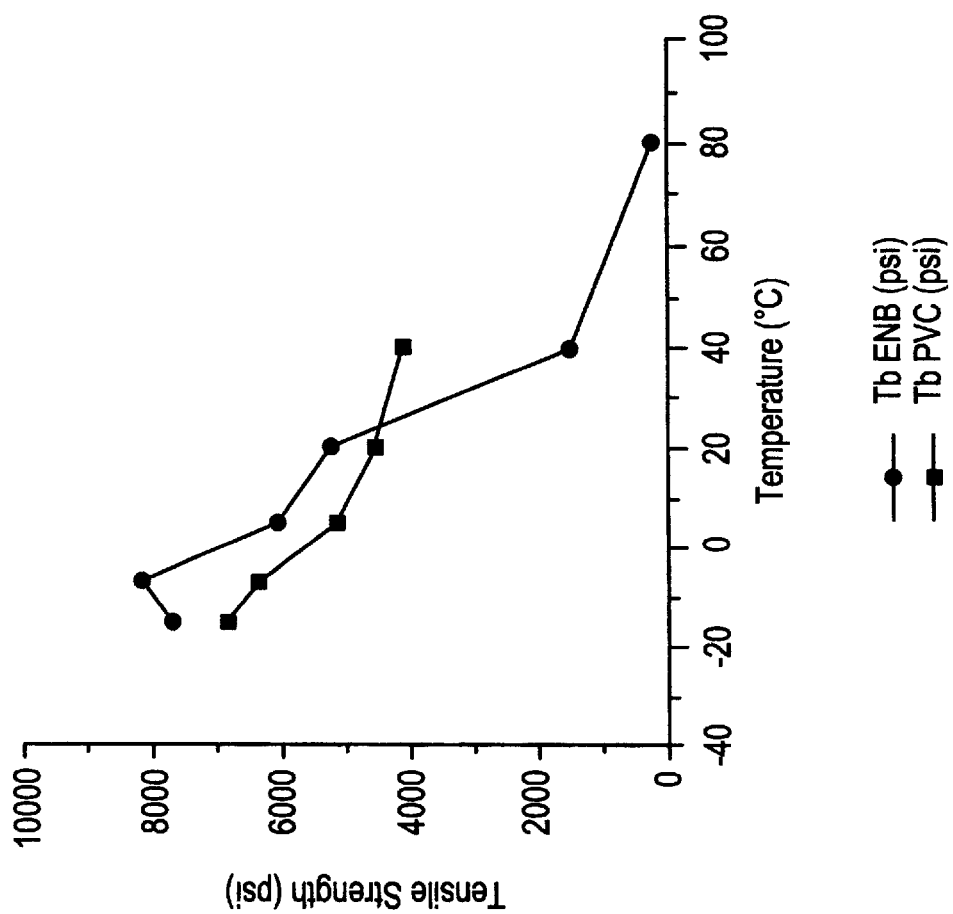
FIG. 6 illustrates a comparison of the ultimate tensile strength of Plasticized PVC (■-■-■) with that of the ethylene-norbornene copolymer of Example 15 (●-●-●), and shows that the Example 15 copolymer has tensile strength better than the Plasticized PVC from −10° C. to about 25° C.
Figure 7:
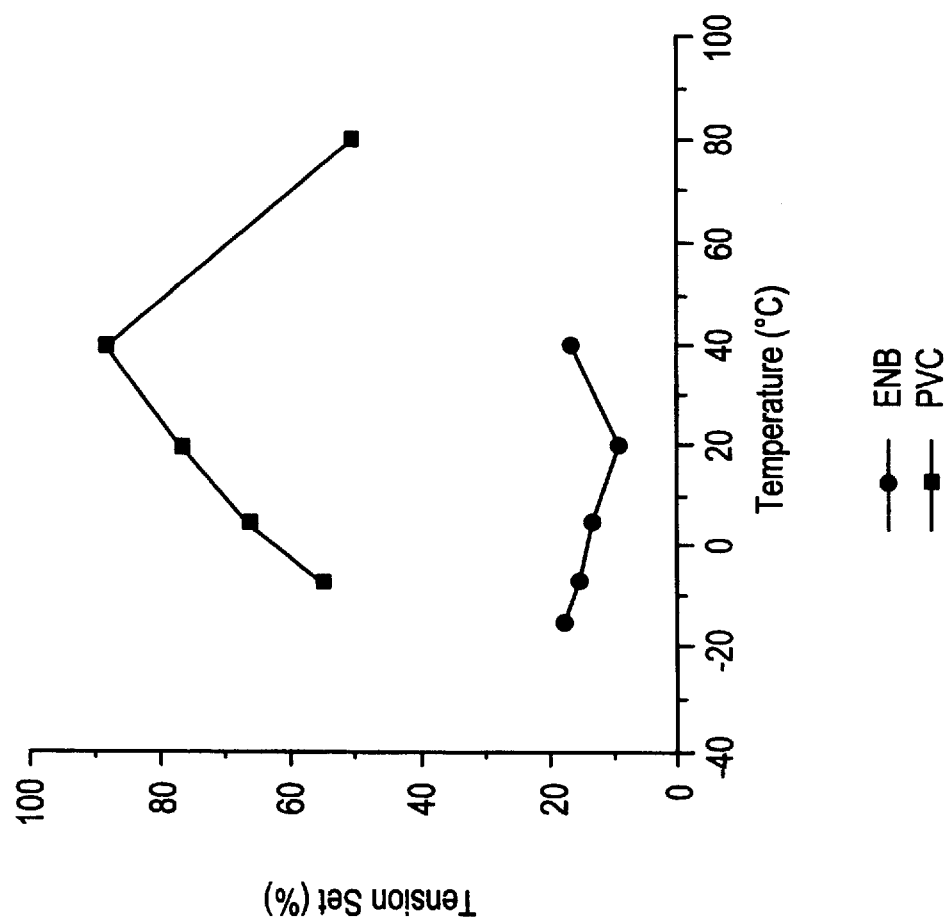
FIG. 7 illustrates another comparison of the tension set, measured after straining to 150% elongation for 10 minutes and then relaxing for three days, of the Plasticized PVC (■-■-■) with the ethylene-norbornene copolymer of Example 15 (●-●-●), and shows that the Example 15 copolymer has much better shape retention than the PVC specimen over the temperature range from −15° C. to 40° C.

The recovery properties of the present copolymers also compare favorably to many polyolefins, as well as PVC, as illustrated in FIG. 5. The present copolymers, while having excellent recovery in the 85–100% range comparably better than PVC and the modified polyolefins, also have strength (stress) comparable to unmodified LDPE and PVC. These data were obtained by pulling the specimens at 20 in./min to 150% strain, holding the specimen at 150% elongation for 10 min, and then allowing the specimen to relax for 10 min.

The ethylene-norbornene copolymer of Example 15 was also compared to a commercially available PVC (GEON 30; B. F. Goodrich) which was plasticized with 23 weight percent diisononal adapate and heat stabilized with 1.5 weight percent CaZn, to obtain typical food wrap specifications. The GEON 30 resin had a calculated $T_g$ of about 70° C. before plasticizing, and about 5° C. with the plasticizer. Specimens of each material were evaluated for tensile properties using an environmental chamber on an Instron tensile apparatus. The tests were run at −15°, −7°, 20°, 40° and 80° C. The tensile properties of the two materials are presented in Table 3.

TABLE 3

| Temp. (°C.) | Tensile Strength (psi) | Modulus (psi) | Elongation at Break (%) | Tensile Strength (150% strain) (psi) | Ten Minute Set (%) | 3 Day Set (%) |
|---|---|---|---|---|---|---|
| Ethylene-Norbornene Copolymer (Example 15) | | | | | | |
| −15 | 7670 | 123,500 | 226 | 4940 | 22.5 | 17.5 |
| −7 | 8175 | 105,600 | 282 | 4750 | 27.5 | 15.0 |
| 5 | 6089 | 4335 | 284 | 3510 | 16.3 | 13.3 |
| 20 | 5222 | 2523 | 409 | 1450 | 13.5 | 9.3 |
| 40 | 1537 | 850 | 441 | 537 | — | 16.3 |
| 80 | 294 | — | 140 | F | F | F |
| Plasticized PVC (GEON 30/23 wt % Diisononal Adapate) | | | | | | |
| −15 | 6822 | — | 177 | B | B | B |
| −7 | 6373 | 91,720 | 205 | 5250* | 110* | 5250* |
| 5 | 5176 | 55,800 | 210 | 4616 | 89 | 4616 |
| 20 | 4567 | 15,130 | 291 | 3454 | 91 | 3454 |
| 40 | 4135 | 2652 | 414 | 2227 | 109 | 2227 |
| 80 | — | — | — | 580 | — | 580 |

— = Not measured
F = Specimen flowed for ~1 min before breaking
* = 3 out of 4 specimens tested broke during elongation
B = Specimen broke during elongation The results indicate that the ENB copolymer has better low temperature properties compared to PVC food wrap, but a relatively low mechanical strength above its $T_g$. The recovery or snapback memory of the ENB copolymer was better than the PVC over the temperature range studied, and the PVC specimen broke during draw at the low temperatures. The elongation at break was also higher for the ENB copolymer than the PVC throughout the temperature range. However, the ENB copolymer flowed at the high temperatures (~60° C.). The upper temperature limit of use is readily extended by lightly crosslinking the ENB copolymer by including a minor proportion of diene in the copolymerization. Similarly, the low temperature range of the ENB copolymer is extended by blending the copolymer with a conventional plasticizer, although the ENB already has a lower use temperature limit than the comparative PVC. Because the copolymer has good low-temperature softness and resilience, the ENB copolymer of Example 15 could be used in medical applications where crimping of blood bags and tubing must be avoided at low storage temperature and contamination from plasticizers is eliminated.

As is apparent from the foregoing description, the materials prepared and the procedures followed relate to specific embodiments of the broad invention. It is apparent from the foregoing general description and the specific embodiments that, while certain forms of the invention have been illustrated and described, various modifications can be made without departing from the spirit and scope of this invention. Accordingly, it is not intended that the invention be limited thereby.

I claim:

1. A process for producing elastic thermoplastic α-olefin/cyclic olefin copolymers, essentially free of dienes, comprising at least 5 mole % of cyclic olefin and having a Tg of less than 50° C., said polymer being elastic between temperatures from the copolymer's Tg to about 100° C., said process comprising contacting one or more α-olefins with one or more cyclic olefins under polymerization conditions in the presence of an activated cyclopentadienyl group-4 transition-metal catalyst system.

2. The process of claim 1, wherein the cyclopentadienyl Group IV transition metal portion is a biscyclopentadienyl transition metal.

3. The process of claim 1, wherein the activated catalyst system is activated by a non-coordinating anion.

4. The process of claim 1, wherein the activated catalyst system is activated by alumoxane.

5. The process of claim 1, wherein a scavenger is present in addition to the activated catalyst system.

6. The process of claim 5, wherein the scavenger is trimethyl aluminum, triethyl aluminum or diethyl aluminum chloride.

* * * * *